(12) United States Patent
Luo et al.

(10) Patent No.: US 12,359,973 B2
(45) Date of Patent: Jul. 15, 2025

(54) FULL-APPEARANCE COLOR MATCHING METHOD AND COLOR MATCHING DEVICE

(71) Applicant: Thousand Lights Lighting (Changzhou) Ltd, Changzhou (CN)

(72) Inventors: Ming Ronnier Luo, Changzhou (CN); Jianlong Zhang, Changzhou (CN); Ting-Wei Huang, Changzhou (CN); Candong He, Changzhou (CN); Xin Xiong, Changzhou (CN); Jing Feng, Changzhou (CN); Xiaoping Zhang, Changzhou (CN)

(73) Assignee: Thousand Lights Lighting (Changzhou) Ltd, Changzhou (CN)

( * ) Notice: Subject to any disclaimer, the term of this patent is extended or adjusted under 35 U.S.C. 154(b) by 368 days.

(21) Appl. No.: 18/074,312

(22) Filed: Dec. 2, 2022

(65) Prior Publication Data
US 2023/0120302 A1 Apr. 20, 2023

Related U.S. Application Data

(63) Continuation of application No. PCT/CN2021/113931, filed on Aug. 23, 2021.

(30) Foreign Application Priority Data

Sep. 25, 2020 (CN) .......................... 202011022913.5

(51) Int. Cl.
*G01J 3/46* (2006.01)
*G01J 3/50* (2006.01)

(52) U.S. Cl.
CPC ............... *G01J 3/505* (2013.01); *G01J 3/463* (2013.01)

(58) Field of Classification Search
CPC .......... G01J 3/505; G01J 3/463; G01J 3/0291; G01J 3/465; G01J 3/501; G01J 3/10; G06T 7/90; G06T 2207/10024
See application file for complete search history.

(56) References Cited

U.S. PATENT DOCUMENTS

| | | | | |
|---|---|---|---|---|
| 2005/0018223 A1* | 1/2005 | Debevec | ................ | H04N 1/603 358/1.9 |
| 2005/0169518 A1* | 8/2005 | Boston | ..................... | G01J 3/462 382/162 |
| 2006/0210153 A1* | 9/2006 | Sara | .......................... | G01J 3/46 382/165 |
| 2015/0304523 A1* | 10/2015 | Imaseki | ................. | H04N 1/603 358/1.9 |

* cited by examiner

*Primary Examiner* — Abdullahi Nur
(74) *Attorney, Agent, or Firm* — Hemisphere Law, PLLC; Zhigang Ma (57) ABSTRACT

A color matching method and a color matching device are provided, the color matching method includes: S1, determining a target color; S2, judging whether color data of a sample is obtained, if yes, proceeding to step S3, and if not, proceeding to step S5; S3, measuring the color data of the sample and displaying a color on a substrate, and proceeding to step S4; S4, judging whether the color displayed on the substrate is consistent with the target color, and if not, proceeding to step S6, and if yes, proceeding to step S7; S5, selecting a color and emitting light consistent with a chromaticity value of the selected color onto the substrate and proceeding to step S6; S6, adjusting the color displayed on the substrate until an adjusted color displayed on the substrate is consistent with the target color, and proceeding to S7; and S7, storing data.

19 Claims, 5 Drawing Sheets

FULL-APPEARANCE COLOR MATCHING METHOD AND COLOR MATCHING DEVICE

TECHNICAL FIELD

The disclosure relates to a color design method, in particular to a full-appearance color matching method and a color matching device.

BACKGROUND

In object dyeing industries, such as textile, printing, ink, paint, plastic and other industries, the color of a product is one of the most critical attributes. Color is involved in a whole design and production process from the beginning of a product design. For example, consumers in different regions have different colors preferences for the same product. Consumers of different ages and genders in the same region also have different color preferences. How to select these colors is the most critical part of the product design. Research and development and design investments for this part are also important expenditures for enterprises to develop and design products.

When a product color is needed to be determined, a customer company needs to determine color parameters with a manufacturer. Generally, it is to determine XYZ tristimulus values of the product color, and the XYZ tristimulus values of the product can be directly measured by a colorimeter. Or $P(\lambda)$ values are measured by an optical radiometer, then the XYZ tristimulus values of the product can be obtained by calculating the $P(\lambda)$ values by a formula. (Formula 1). In a traditional appearance management supply chain, the customer company and the manufacturer must determine a target color range firstly, such as magenta, lake blue, etc., and then the manufacturer will make a proof within the target color range and produce multiple samples of similar colors, and provide these samples to the customer company for screening. The industrial designer of the customer company screens these samples and gives opinions, and then the manufacturer make a proof again according to the demand and submits them to the customer company for re-screening. Generally, the process needs to be repeated more than 2-3 times to finally determine the product color, and then the XYZ tristimulus values of the color are measured with a colorimeter. In this process, the manufacturer need to invest large manpower and material resources, and the whole supply chain process is time-consuming and inefficient. Therefore, it is urgent to design a more efficient and fast method and device to allow the industrial designer of the customer company to adjust and change colors of samples directly under an observation environment of a standard light source, and thus the industrial designer can directly determine a final color, so as to determine the XYZ values of the product, save manpower, material resources and time costs, shorten time of the whole supply chain, and improve efficiency.

SUMMARY

In order to overcome the shortcomings of the prior art, a purpose of the disclosure is to provide a full-appearance color matching method and a color matching device that can efficiently and quickly restore and store a target color to form electronic information and images, and the electronic information and images can be accurately calibrated and transmitted through the Internet, which greatly improves efficiency and save resources.

In order to solve the above problem, technical solutions of the disclosure are as follows:

A color matching method, including following steps:

S1, determining a target color;

S2, judging whether color data of an actual sample is obtained, if yes, proceeding to step S3, and if not, proceeding to step S5;

S3, measuring the color data of the actual sample by a photometric instrument and displaying a color consistent with the actual sample on a substrate, and proceeding to step S4;

S4, judging whether the color displayed on the substrate is consistent with the target color, and if not, proceeding to step S6, and if yes, proceeding to step S7;

S5, selecting a color by a controlling software, and emitting, by a light distribution light source, light consistent with a chromaticity value of the selected color onto the substrate for displaying the selected color, and proceeding to step S6;

S6, adjusting the color displayed on the substrate until an adjusted color displayed on the substrate is consistent with the target color, and proceeding to S7; and S7, storing data.

In an embodiment, the step S3 includes following steps:

S31, calibrating a light source;

S32, measuring, by the photometric instrument, the color data of the sample;

S33, emitting, by the light distribution light source, light consistent with a chromaticity value of the measured color data onto the substrate for displaying a color;

S34, measuring, by the photometric instrument, color data on the substrate; and

S35, judging whether the color data on the substrate is consistent with the color data of the sample, and if yes, proceeding to step S4, and if not, returning to the step S32.

In an embodiment, the light distribution light source is one selected from a group consisting of a self-luminous light source, a fluorescent light source, a combination light source of the self-luminous light source and the fluorescent light source, a light source obtained by the self-luminous light source passing through a filter, a light source obtained by the fluorescent light source passing through a filter, and a light source obtained by the self-luminous light source and the fluorescent light source passing through filters; and the self-luminous light source is one selected from a group consisting of a light-emitting diode, a laser diode, an organic light-emitting semiconductor, and a quantum dot light-emitting diode.

A color matching device, applied to the color matching method described in any of the above items. The color matching device includes a color assessment device with adjustable color temperature and illuminance, the light distribution light source with adjustable color temperature and brightness, and the substrate; a first side of the color assessment device is provided with an observation window, a second side of the color assessment device is provided with an observation hole, a center of the substrate is disposed at an extension line of a central axis of the observation hole, and the light distribution light source is configured to emit light onto the substrate for displaying a color.

In an embodiment, the substrate is a white opaque structure.

In an embodiment, the light distribution light source is movably connected to the second side of color assessment device provided with the observation hole, and an angle adjusting device is connected between the light distribution light source and the color assessment device.

In an embodiment, the angle adjusting device is a motor assembly.

In an embodiment, the substrate is a colorless and transparent structure.

In an embodiment, the light distribution light source is arranged in parallel with the substrate at intervals, and the light distribution light source is disposed at a side of the substrate far away from the color assessment device.

In an embodiment, slots are respectively disposed at two opposite sides of the observation hole, an insertion piece is movably inserted into the slots, and a middle of the insertion piece is provided with a hole Compared with the prior art, beneficial effects of the disclosure is that: in the disclosure, the color light emitted by a light distribution light source is used to color a substrate, thus the color, texture, penetrability and feel of an actual sample can be more realistically achieved in visual matching, so as to restore the actual sample or expected appearance to the greatest extent; the disclosure can mark and store the color on the substrate in a form of electronic information to achieve accurate transmission and restoration, which is suitable for color management of the industrial chain. The disclosure can complement the hand feel, texture, permeability and other features that cannot be achieved by the current electronic information or image system, and greatly shortens the production time of products from the design end to the manufacturing end through the dealer and can more than double the efficiency of the whole supply chain process. As the disclosure replaces the production of traditional actual samples, the disclosure can also significantly reduce resource waste and save design costs.

DESCRIPTION OF REFERENCE NUMERALS

1—color assessment device; 101—light source of color assessment cabinet; 102—observation hole; 103—slot; 104—insertion piece; 2—light distribution light source; 3—substrate; 4—supporting device; 5—angle adjusting device; 6—base; 7—shading room.

DETAILED DESCRIPTION OF EMBODIMENTS

The disclosure will be further described in detail below in combination with attached drawings and specific embodiments.

It should be noted that in the description of technical solutions of the disclosure, some orientation words used to clearly describe technical features of the disclosure, such as "front", "back", "top", "bottom", "inside", "outside", and others are all based on the orientation of the attached drawings of the disclosure.

Embodiment 1

Figure 1:
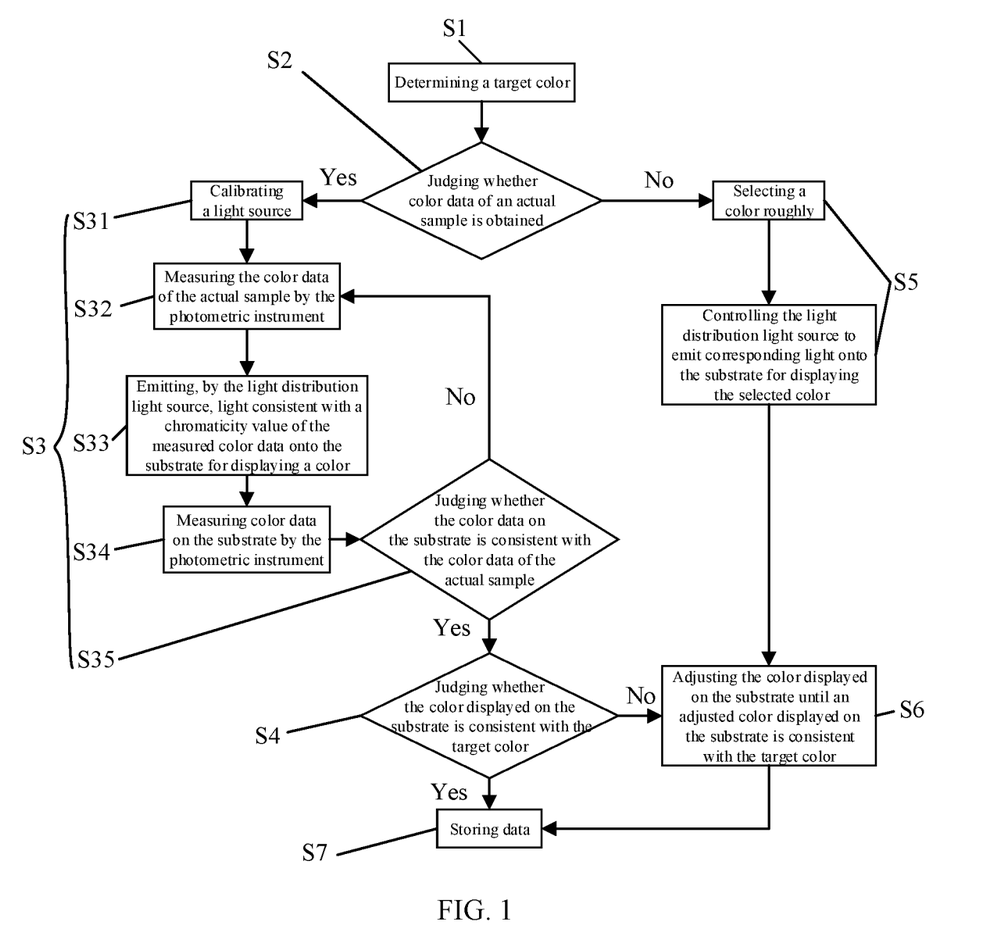
FIG. 1 is a flow chart of a full-appearance color matching method of the disclosure.

A full-appearance color matching method is shown in FIG. 1. A color assessment device 1 is firstly turned on and configured to provide a standard light source environment, the color assessment device can be a color assessment cabinet, a color assessment microscope, or any other device that can achieve the same effect. Then a substrate 3 with appropriate texture, transmissivity and appearance characteristics is selected from a preset virtual sample texture library, and then a control software is started. The specific steps of light distribution (i.e., color matching) are as follows:

S1, determining a target color; the target color refers to a color and appearance that need to be restored or expect to be achieved, including color, texture, luster, permeability and other characteristics;

S2, judging whether color data of an actual sample is obtained, if yes, proceeding to step S3, and if not, proceeding to step S5; in order to determine whether the color data of the actual sample can be obtained, firstly determining whether there is an actual sample with the same or similar color as the target color and whether there is a photometric instrument. If there are the photometric instrument and the actual sample, the color data of the actual sample can be obtained. If there is no photometric instrument or no actual sample, the color data of the actual sample cannot be obtained;

S3, measuring the color data of the actual sample by the photometric instrument and displaying a color consistent with the actual sample on the substrate 3, and proceeding to step S4;

S4, judging whether the color displayed on the substrate 3 is consistent with the target color, and if not, proceeding to step S6, and if yes, proceeding to step S7;

S5, roughly selecting a color by the controlling software, and controlling light distribution light sources 2 to emit light consistent with a chromaticity value of the selected color onto the substrate 3 for displaying the color; specifically, the selected color can be a color stored in a database, a Munsell color book or a natural color system (NCS); after the color is selected, the controlling software controls the light distribution light sources 2 to emit light consistent with the chromaticity value of the selected color onto the substrate 3 for displaying the color; the color displayed on the substrate 3 is compared with the target color, if the color difference between them is large, continuing to adjust the color until the adjusted color displayed on the substrate 3 is close to the target color, then proceeding to S6;

S6, adjusting the color displayed on the substrate 3 until the adjusted color displayed on the substrate 3 is consistent with the target color, and proceeding to S7; specifically, the color is adjusted by using rectangular coordinates of CIELAB color space (L*, a*, b*) or polar coordinates lightness (L*), chroma (C*) and hue (h). HSV color space or RGB color card can also be used for color matching to achieve the target color; and S7, storing data; that is, the color data of the adjusted color displayed on the substrate 3 is stored and formed into a database when the adjusted color is consistent with the target color, and a color number, a substrate number and L*, a*, b* values of the CIELAB color space are marked, so that the color can be directly obtained from the database when needed later, saving the time for redesign and color matching.

Specifically, the step S3 includes following steps:

S31, calibrating a light source; the controlling software controls the photometric instrument to measure and store light intensities of each channel of the color assessment device 1 and the light distribution light source 2, but after a period of time, the light intensities will decline, and thus the controlling software will control the photometric instrument to re-measure each time it is used, so that the data of the database will always reflect the current situation, that is, the calibrated light source;

S32, controlling the photometric instrument to measure the color data of the actual sample;

S33, controlling the light distribution light sources 2 to emit light consistent with a chromaticity value of a measured result (also referred to as measured color data) onto the substrate 3 for displaying a color;

S34, controlling the photometric instrument to measure color data on the substrate 3; and S35, judging whether the color data on the substrate 3 is consistent with the color data of the actual sample, and if yes, proceeding to step S4, and if not, returning to the step S32.

Specifically, the light distribution light source 2 is one selected from a group consisting of a self-luminous light source, a fluorescent light source, a combination light source of the self-luminous light source and the fluorescent light source, and a light source obtained by the self-luminous light source passing through a filter, a light source obtained by the fluorescent light source passing through a filter, and a light source obtained by the self-luminous light source and the fluorescent light source obtained by the self-luminous light source and the fluorescent light source passing through filters. The self-luminous light source is one selected from a group consisting of a light-emitting diode, a laser diode, an organic light-emitting semiconductor, and a quantum dot light-emitting diode.

Furthermore, the photometric instrument in this embodiment is a colorimeter or a spectral radiometer. The colorimeter is configured to measure XYZ tristimulus values of the actual sample, and the spectral radiometer is configured to measure a value of an energy function $P(\lambda)$ of an appearance color of the actual sample, and then the XYZ tristimulus values are calculated. The calculation formula is as follows:

$$\begin{cases} X = \sum P(\lambda) \cdot xb(\lambda) d\lambda \\ Y = \sum P(\lambda) \cdot yb(\lambda) d\lambda \\ Z = \sum P(\lambda) \cdot zb(\lambda) d\lambda \end{cases} \text{Formula 1}$$

Where, $P(\lambda) = SPD(\lambda) \cdot R(\lambda)$.

Where, $xb(\lambda)$, $yb(\lambda)$, and $zb(\lambda)$ represent color matching functions, $SPD(\lambda)$ represents a relative power distribution function of a light source (i.e., spectral power distribution function of the light distribution light source 2), $R(\lambda)$ represents reflectance or transmittance of a measured object.

Figure 2:
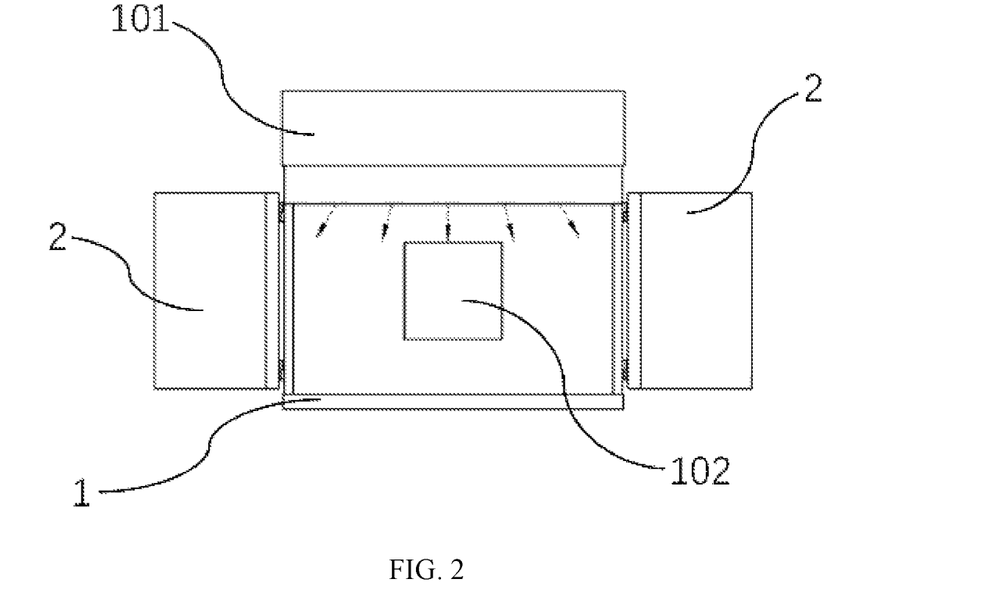
FIG. 2 is a front view of a color matching device in an embodiment 1.
Figure 3:
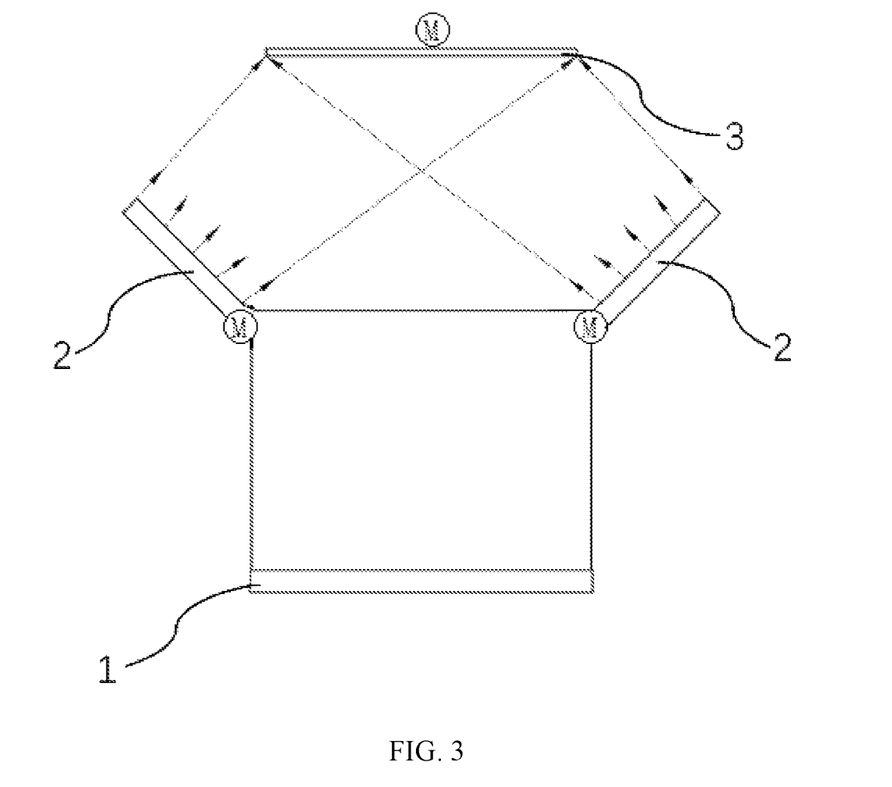
FIG. 3 is a top view of the color matching device in the embodiment 1.
Figure 7:
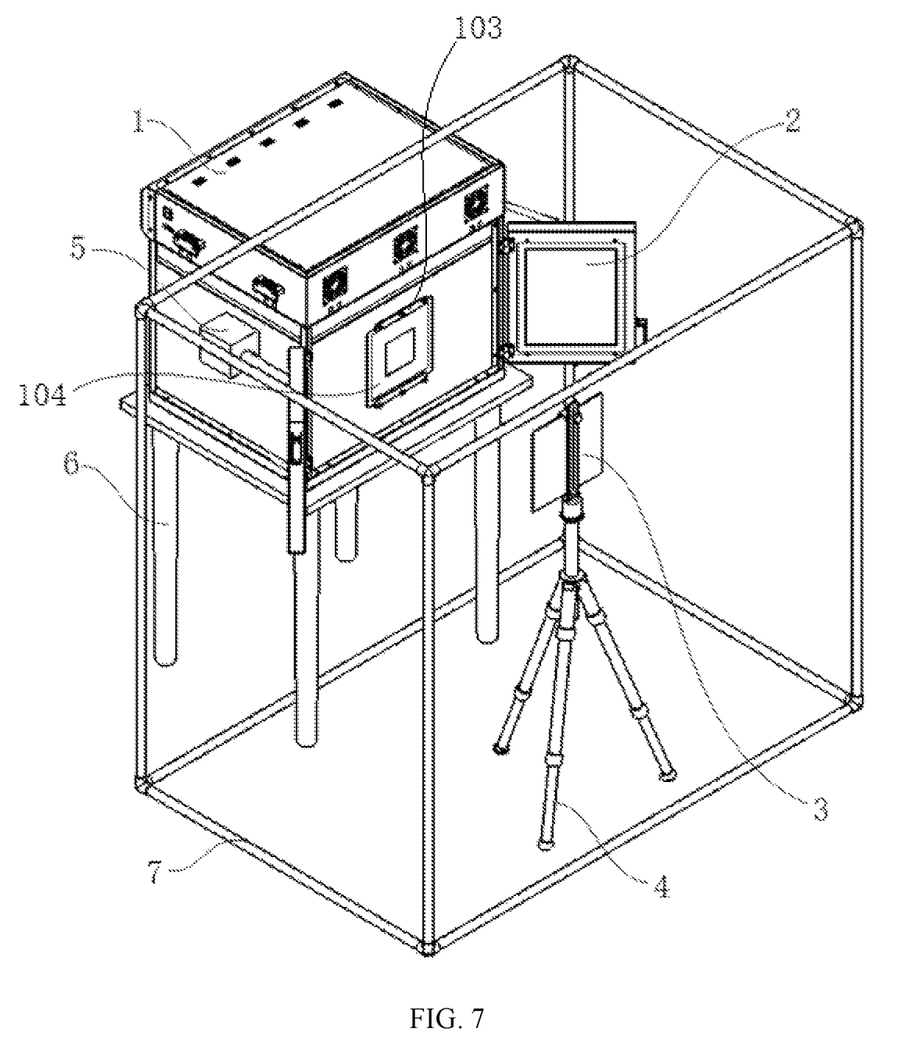
FIG. 7 is a use state diagram of the color matching device of the disclosure.

As shown in FIG. 2, FIG. 3 and FIG. 7, a color matching device is applicable to the full-appearance color matching method. The color matching device includes the color assessment device 1 with adjustable color temperature and illuminance, the light distribution light sources 2 with adjustable color temperature and brightness, and the substrate 3. Specifically, the color assessment device 1 is a color assessment cabinet. Each of the light distribution light sources 2 is a light distribution lamp with a flat plate shape. The background color of the color assessment cabinet is medium gray. A top of the color assessment cabinet is provided with a light source 101 for illuminating the color assessment cabinet from above. The light source 101 of the color assessment cabinet includes a light source plate and a light-emitting diode (LED) lamp bead group. The LED lamp bead group includes four LED lamp bead arrays which are evenly distributed on the light source plate. Each of the LED lamp bead arrays is a square array. With this structure, the light distribution function of the four LED lamp bead arrays can meet spectral power distribution (SPD) specifications of the standard light source, and light provided by the four LED lamp bead arrays is more uniform and stable. A first side of the color assessment cabinet is provided with an observation window, which is convenient for an observer to observe here; a second side of the color assessment cabinet is provided with an observation hole 102, which makes the substrate 3 appear in the observation hole 102, and thus the observer can see the substrate 3 appeared under the standard light source from the observation window. A center of the substrate 3 is disposed at an extension line of a central axis of the observation hole 102, and the light distribution lamps are configured to emit light onto the substrate 3 for displaying a color. Multichannel light sources are used for the color assessment cabinet and the light distribution lamps. The color assessment cabinet provides a standard visual observation environment. A standard light source is selected as the light source 101 of the color assessment cabinet for lighting, such as CIED65 (or D50, D75, D55) daylight source, A light source, CIELED light source and any other industrial light source published recently. Each of the light distribution lamps is provided with a multi-channel LED light source having a wide color gamut. Specifically, in this embodiment, six uniformly distributed LED light sources are used in each of the light distribution lamps.

The substrate 3 is illuminated with different colored light to simulate an appearance of a real object (also referred to an actual sample), and a final appearance of the substrate 3 is formed. Therefore, the final appearance of the substrate 3 that is consistent with the visual information (such as the color, texture and permeability) of the actual sample is called a virtual sample.

In the embodiment, the light distribution lamps have a number of two. The light distribution lamps are movably connected to the second side provided with the observation hole 102, and the light distribution lamps are symmetrically disposed. Geometric optical conditions of the light distribution lamp and the substrate 3 are 45°: 0° (i.e., the ratio of the incident and reflected angles of light). The substrate 3 is a white opaque structure; an angle adjusting device 5 is connected between the light distribution lamp and the color assessment cabinet. Specifically, the angle adjustment device 5 is a motor assembly, and rotation angles of the light distribution lamp in a horizontal direction can be arbitrarily adjusted by controlling the motor assembly.

The color matching device of the embodiment further includes a supporting device 4, a base 6, and a shading room 7. The color assessment cabinet is disposed on the base 6, which make a height of the observation window of the color assessment cabinet conform to human engineering mechanics and is convenient for observation. The supporting device 4 is configured to support the substrate 3, and thus the substrate 3 can be appeared in the observation hole 102 of the color assessment cabinet. The supporting device 4 of this embodiment is further provided with a motor assembly that can control the rotation of the substrate 3, so that the angle of the substrate 3 can be adjusted as needed. The shading room 7 includes a light shielding cloth and a frame configured to support the light shielding cloth. The light shielding cloth adopts a coated light shielding cloth with good light shielding performance. The shading room 7 is configured to provide a dark external environment, which can make the color displayed on the substrate 3 more accurate without interferences.

Figure 6:
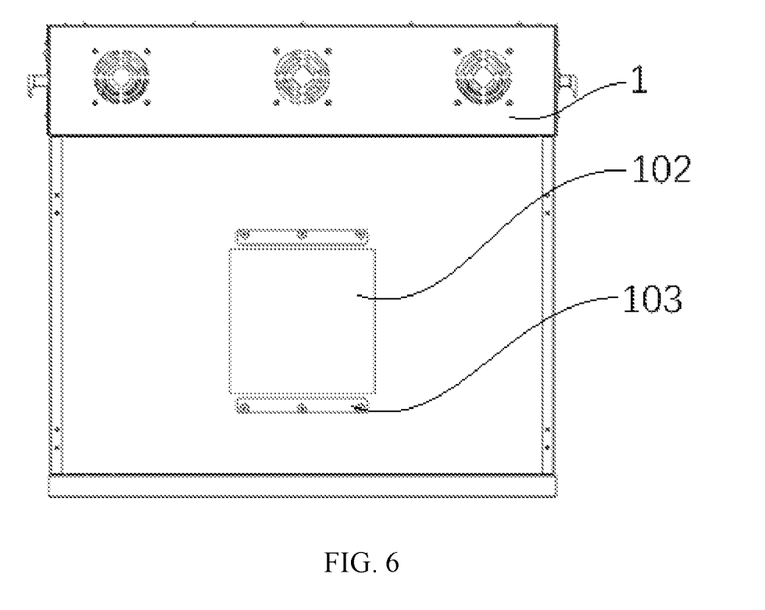
FIG. 6 is a front view of a color assessment device of the disclosure.

Furthermore, as shown in FIG. 6 and FIG. 7, slots 103 are respectively disposed at two opposite sides of the observation hole 102, an insertion piece 104 is movably inserted into the slots 103, and a middle of the insertion piece 104 is provided with a hole. The inserting piece 104 can cover the observation hole 102, and the middle of the insertion piece 104 is provided with the hole. In this embodiment, the insertion piece 104 can be replaced. Hole diameters of different insertion pieces 104 are different. When the color matching device is used, the different insertion pieces 104 can be replaced to provide different hole diameters for observation.

Embodiment 2

Figure 4:
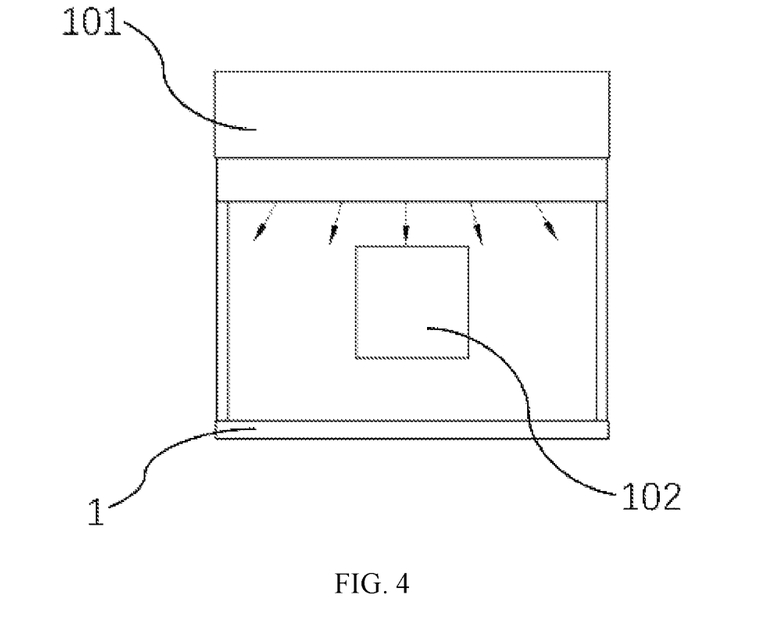
FIG. 4 is a front view of the color matching device in an embodiment 2.
Figure 5:
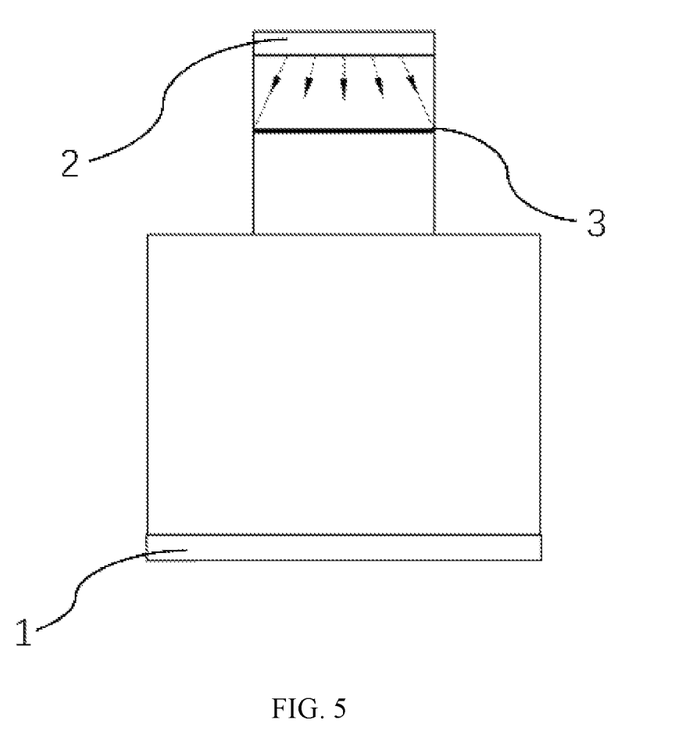
FIG. 5 is a top view of the color matching device in the embodiment 2.

As shown in FIG. 4 and FIG. 5, this embodiment provides a color matching device, the difference between the color matching device of the embodiment 2 and the color matching device of the embodiment 1 is that: the substrate 3 of the embodiment 2 is a colorless and transparent structure. Correspondingly, a light distribution lamp (i.e., light distribution light source 2) is arranged in parallel with the substrate 3 at intervals, and the light distribution lamp is disposed at a side of the substrate 3 far away from the color assessment cabinet. The light from the light distribution lamp is transmitted to the substrate 3 from a back of the substrate 3, and a color is displayed on the substrate 3. The observer can see the color and texture of the substrate 3 from the observation hole 102.

The angle adjusting device of the embodiment 2 is a cylinder assembly. An end of the cylinder assembly is hinged on the light distribution lamp, and the other end of the cylinder assembly is hinged on a side of the color assessment cabinet close to the light distribution lamp. By controlling a piston cylinder in the cylinder assembly to stretch out and draw back, the rotation of the light distribution lamp is controlled and an incidence angle of the light is adjusted.

When the color matching device is used, the substrate 3 is fixed on the supporting device 4, and the observation hole 102 or the insertion piece 104 with a hole diameter matching with the substrate 3 is used according to the size of the substrate 3. If the insertion piece 104 is used, the insertion piece 104 is inserted into the slots 103 to cover the observation hole 102 on the color assessment cabinet, and a hole in a middle of the insertion piece 104 is used as a new observation hole 102. Then a designer stands at an opening of the color assessment cabinet observes the substrate 3 on the supporting device 4 through the observation hole 102, and the designer adjusts an apparent color of the substrate 3 by adjusting the light distribution lamp and the color assessment cabinet. During specific adjustment, a standard light source of the color assessment cabinet is adjusted to keep an observation environment. Then the color temperature, brightness and illumination angle of the light distribution lamp are adjusted through the above color matching method, so as to change the apparent color of the substrate 3 to make the apparent color be consistent with the target color, and then the substrate 3 and its apparent color are marked and stored to form a virtual sample. The virtual sample is sent to a user (such as a manufacturer or a dealer), the user will restore the virtual sample through the same color matching device after receiving it. If the user is not satisfied with the virtual sample, the feedback will be sent to a design platform for the designer to redesign and improve. If the user is satisfied with the virtual sample, the user can use a color matching software of a computer to restore the virtual sample to generate a color formulation which is required for actual production and carry out the production.

To sum up, a full-appearance color matching method and a color matching device of the disclosure have following innovative applications and advantages:

1) An optoelectronic reference color library is established, a virtual sample is stored and collected by marking color number, substrate number and CIELAB L*, a*, b* values to form a reference color library. In subsequent use, it can directly select the corresponding color number and substrate number in the optoelectronic reference color library to quickly extract the virtual sample that are consistent with a target color.

2) A virtual texture sample library is established to provide representative texture, permeability and appearance characteristics.

3) It is convenient for designers to use representative texture organization or translucent substrate for color design and color creation in a perfect palette.

4) Users (such as sellers) adopt the method of screening virtual samples instead of traditional actual samples, which can save more than half of the time in the design process, reduce unnecessary waste of materials and energy, and greatly shorten the time required for products from the design end to the manufacturing end.

5) Color scientific data of virtual samples is provided, such as CIELAB data, to ensure the accurate realization of virtual samples.

6) The virtual sample is stored in the computer in the form of electronic information, which can achieve full appearance and long-distance information communication, including color, texture, permeability and appearance characteristics.

7) The feedback system is set. When the color data on the substrate 3 measured by the photometric instrument is inconsistent with the target color, i.e., there is a deviation, the light can be fed back and reallocated to ensure the stability of the light source and the accuracy of color matching.

8) Users (such as manufacturers) can use conventional computer color matching software to make the virtual samples generate the color formulation of actual samples, which can accurately realize that the produced products have the same appearance as the virtual samples, including color, texture, permeability and appearance characteristics.

In a full-appearance color matching method and a color matching device of the disclosure, the color light emitted by a light distribution light source 2 is used to color a substrate 3, thus the color, texture, penetrability and feel of an actual sample can be more realistically achieved in visual matching, so as to restore the actual sample or expected appearance to the greatest extent; the disclosure can mark and store the color on the substrate 3 in a form of electronic information to achieve accurate transmission and restoration, which is suitable for color management of the industrial chain. The disclosure can complement the hand feel, texture, permeability and other features that cannot be achieved by the current electronic information or image system, and greatly shortens the production time of products from the design end to the manufacturing end through the dealer and can more than double the efficiency of the whole supply chain process. As the disclosure replaces the production of traditional actual samples, the disclosure can also significantly reduce resource waste and save design costs, which greatly improves production efficiency of enterprises.

For those skilled in the art, other corresponding changes and modifications can be made according to the above described technical solutions and concepts, and all these changes and modifications should fall within the protection scope of the claims of the disclosure.

What is claimed is:

1. A color matching method, comprising:
S1, determining a target color;
S2, judging whether color data of a sample is obtained, if yes, proceeding to step S3, and if not, proceeding to step S5;
S3, measuring the color data of the sample by a photometric instrument and displaying a color consistent with the sample on a substrate (3), and proceeding to step S4;
S4, judging whether the color displayed on the substrate (3) is consistent with the target color, and if not, proceeding to step S6, and if yes, proceeding to step S7;
S5, selecting a color by a controlling software, and emitting, by a light distribution light source (2), light consistent with a chromaticity value of the selected color onto the substrate (3) for displaying the selected color, and proceeding to step S6;
S6, adjusting the color displayed on the substrate (3) until an adjusted color displayed on the substrate (3) is consistent with the target color, and proceeding to S7; and
S7, storing data;
wherein the step S3 comprises:
S31, controlling, by the controlling software, the photometric instrument to measure and store light intensities of each channel of a color assessment device (1) and the light distribution light source (2) to calibrate a light source.

2. The color matching method according to claim 1, wherein the step S3 comprises following steps:
S32, measuring, by the photometric instrument, the color data of the sample;
S33, emitting, by the light distribution light source (2), light consistent with a chromaticity value of the measured color data onto the substrate (3) for displaying a color;
S34, measuring, by the photometric instrument, color data on the substrate (3); and
S35, judging whether the color data on the substrate (3) is consistent with the color data of the sample, and if yes, proceeding to step S4, and if not, returning to the step S32.

3. The color matching method according to claim 2, wherein the light distribution light source (2) is one selected from a group consisting of a self-luminous light source, a fluorescent light source, a combination light source of the self-luminous light source and the fluorescent light source, a light source obtained by the self-luminous light source passing through a filter, a light source obtained by the fluorescent light source passing through a filter, and a light source obtained by the self-luminous light source and the fluorescent light source passing through filters; and the self-luminous light source is one selected from a group consisting of a light-emitting diode, a laser diode, an organic light-emitting semiconductor, and a quantum dot light-emitting diode.

4. A color matching device, applied to a color matching method, wherein the color matching device comprises a color assessment device (1) with adjustable color temperature and illuminance, a light distribution light source (2) with adjustable color temperature and brightness, and a substrate (3); a first side of the color assessment device (1) is provided with an observation window, a second side of the color assessment device (1) is provided with an observation hole (102), a center of the substrate (3) is disposed at an extension line of a central axis of the observation hole (102), and the light distribution light source (2) is configured to emit light onto the substrate (3) for displaying a color;
wherein the color matching method comprises:
S1, determining a target color;
S2, judging whether color data of a sample is obtained, if yes, proceeding to step S3, and if not, proceeding to step S5;
S3, measuring the color data of the sample by a photometric instrument and displaying a color consistent with the sample on the substrate (3), and proceeding to step S4;
S4, judging whether the color displayed on the substrate (3) is consistent with the target color, and if not, proceeding to step S6, and if yes, proceeding to step S7;
S5, selecting a color by a controlling software, and emitting, by the light distribution light source (2), light consistent with a chromaticity value of the selected color onto the substrate (3) for displaying the selected color, and proceeding to step S6;
S6, adjusting the color displayed on the substrate (3) until an adjusted color displayed on the substrate (3) is consistent with the target color, and proceeding to S7; and
S7, storing data.

5. The color matching device according to claim 4, wherein the substrate (3) is a white opaque structure.

6. The color matching device according to claim 5, wherein the light distribution light source (2) is movably connected to the second side of color assessment device (1) provided with the observation hole (102), and an angle adjusting device (5) is connected between the light distribution light source (2) and the color assessment device (1).

7. The color matching device according to claim 6, wherein the angle adjusting device (5) is a motor assembly.

8. The color matching device according to claim 4, wherein the substrate (3) is a colorless and transparent structure.

9. The color matching device according to claim 8, wherein the light distribution light source (2) is arranged in parallel with the substrate (3) at intervals, and the light distribution light source (2) is disposed at a side of the substrate (3) far away from the color assessment device (1).

10. The color matching device according to claim 4, wherein slots (103) are respectively disposed at two opposite sides of the observation hole (102), an insertion piece (104) is movably inserted into the slots (103), and a middle of the insertion piece (104) is provided with a hole.

11. The color matching device according to claim 4, wherein the step S3 comprises following steps:
S31, calibrating a light source;
S32, measuring, by the photometric instrument, the color data of the sample;

S33, emitting, by the light distribution light source (2), light consistent with a chromaticity value of the measured color data onto the substrate (3) for displaying a color;

S34, measuring, by the photometric instrument, color data on the substrate (3); and S35, judging whether the color data on the substrate (3) is consistent with the color data of the sample, and if yes, proceeding to step S4, and if not, returning to the step S32.

12. The color matching device according to claim 4, wherein the light distribution light source (2) is one selected from a group consisting of a self-luminous light source, a fluorescent light source, a combination light source of the self-luminous light source and the fluorescent light source, a light source obtained by the self-luminous light source passing through a filter, a light source obtained by the fluorescent light source passing through a filter, and a light source obtained by the self-luminous light source and the fluorescent light source passing through filters; and the self-luminous light source is one selected from a group consisting of a light-emitting diode, a laser diode, an organic light-emitting semiconductor, and a quantum dot light-emitting diode.

13. The color matching method according to claim 1, wherein the substrate (3) is a white opaque structure, and the light distribution light source (2) is movably connected to a side of color assessment device (1).

14. The color matching method according to claim 1, wherein the substrate (3) is a colorless and transparent structure, and the light distribution light source (2) is arranged in parallel with the substrate (3) at intervals, and disposed at a side of the substrate (3) far away from the color assessment device (1).

15. The color matching method according to claim 1, wherein the target color is a color and an appearance to be achieved, comprising color, texture, luster and permeability.

16. The color matching method according to claim 1, wherein the step S2 comprises: determining whether there is an actual sample with same or similar color as the target color and whether there is a photometric instrument, when there are the photometric instrument and the actual sample, the color data of the sample is obtained; if there is no photometric instrument or no actual sample, the color data of the sample is not obtained.

17. The color matching method according to claim 1, wherein in the step S5, the selected color is a color stored in a database, a color book or a natural color system.

18. The color matching method according to claim 1, wherein in the step S6, the color displayed on the substrate (3) is adjusted by using rectangular coordinates of CIELAB color space (L*, a*, b*) or polar coordinates lightness (L*), chroma (C*) and hue (h).

19. The color matching method according to claim 1, wherein the step S7 comprises: storing and forming color data of the adjusted color displayed on the substrate (3) into a database when the adjusted color is consistent with the target color, wherein a color number, a substrate number and L*, a*, b* values of the CIELAB color space are marked.

* * * * *